(12) United States Patent
Makower et al.

(10) Patent No.: US 10,382,516 B2
(45) Date of Patent: Aug. 13, 2019

(54) DETECTING UPSCALED SOURCE VIDEO

(71) Applicant: Apple Inc., Cupertino, CA (US)

(72) Inventors: David Makower, Milpitas, CA (US);
Paul A. Francis, Cupertino, CA (US);
Yu Chieh Lin, San Jose, CA (US)

(73) Assignee: APPLE INC., Cupertino, CA (US)

( * ) Notice: Subject to any disclaimer, the term of this patent is extended or adjusted under 35 U.S.C. 154(b) by 50 days.

(21) Appl. No.: 15/590,442

(22) Filed: May 9, 2017

(65) Prior Publication Data

US 2018/0332093 A1 Nov. 15, 2018

(51) Int. Cl.
*H04L 29/06* (2006.01)
*H04N 19/146* (2014.01)
*H04N 19/172* (2014.01)
*H04N 19/119* (2014.01)

(52) U.S. Cl.
CPC ........ *H04L 65/607* (2013.01); *H04L 65/4069* (2013.01); *H04L 65/605* (2013.01); *H04N 19/119* (2014.11); *H04N 19/146* (2014.11); *H04N 19/172* (2014.11)

(58) Field of Classification Search
CPC ............... H04L 29/08072; H04L 29/06; H04L 29/0809; H04L 29/08117; G06Q 30/02
See application file for complete search history.

(56) References Cited

U.S. PATENT DOCUMENTS

| | | | | |
|---|---|---|---|---|
| 8,006,186 | B2* | 8/2011 | Kellock | G11B 27/34 |
| | | | | 715/721 |
| 9,813,707 | B2* | 11/2017 | Zhang | H04N 7/54 |
| 2009/0073320 | A1* | 3/2009 | Todo | G09G 5/006 |
| | | | | 348/705 |
| 2013/0128958 | A1* | 5/2013 | Gamei | H04N 19/13 |
| | | | | 375/240.03 |
| 2013/0343729 | A1* | 12/2013 | Rav-Acha | G11B 27/28 |
| | | | | 386/285 |
| 2015/0302894 | A1* | 10/2015 | Boiman | G11B 27/031 |
| | | | | 386/285 |
| 2016/0330532 | A1* | 11/2016 | Bostick | H04N 5/225 |
| 2017/0085885 | A1* | 3/2017 | Tanner | H04N 19/156 |
| 2018/0132011 | A1* | 5/2018 | Shichman | H04N 21/234 |

\* cited by examiner

*Primary Examiner* — Abdullahi E Salad
(74) *Attorney, Agent, or Firm* — Baker & Hostetler LLP

(57) ABSTRACT

Techniques are disclosed for estimating a source resolution of image data presented to a system. According to these techniques, input image data may be converted to a domain of frequency coefficients. Each coefficient may represent content of the input image along a respective pair of frequencies extending in two dimensions. For each set of frequency coefficients having a common frequency in one of the dimensions, zero crossings of coefficient values may be detected. The zero crossings may be counted at each frequency position in the second dimension. An estimate of the input image's source resolution may be estimated from a comparison of the zero crossings. For video, this process may be performed across images of an input video sequences.

26 Claims, 7 Drawing Sheets

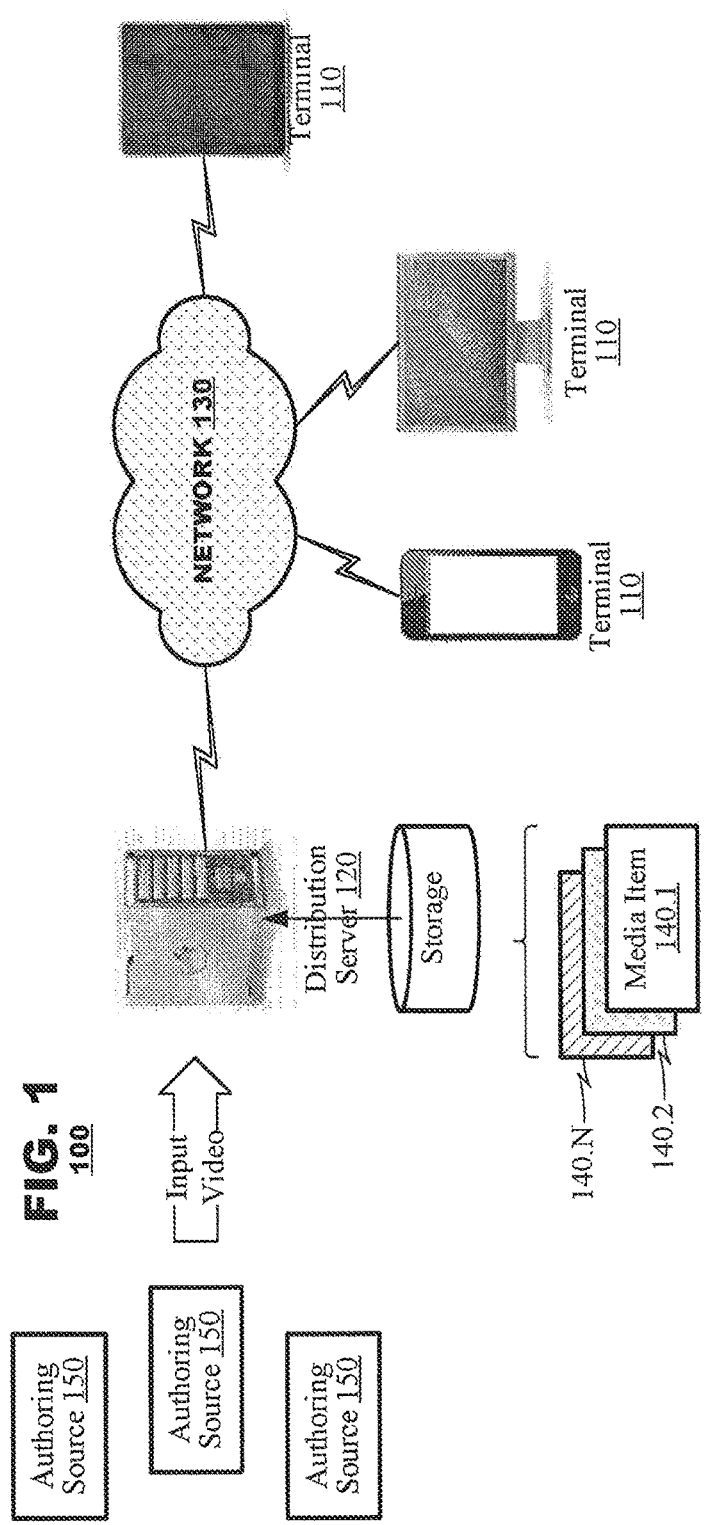

200

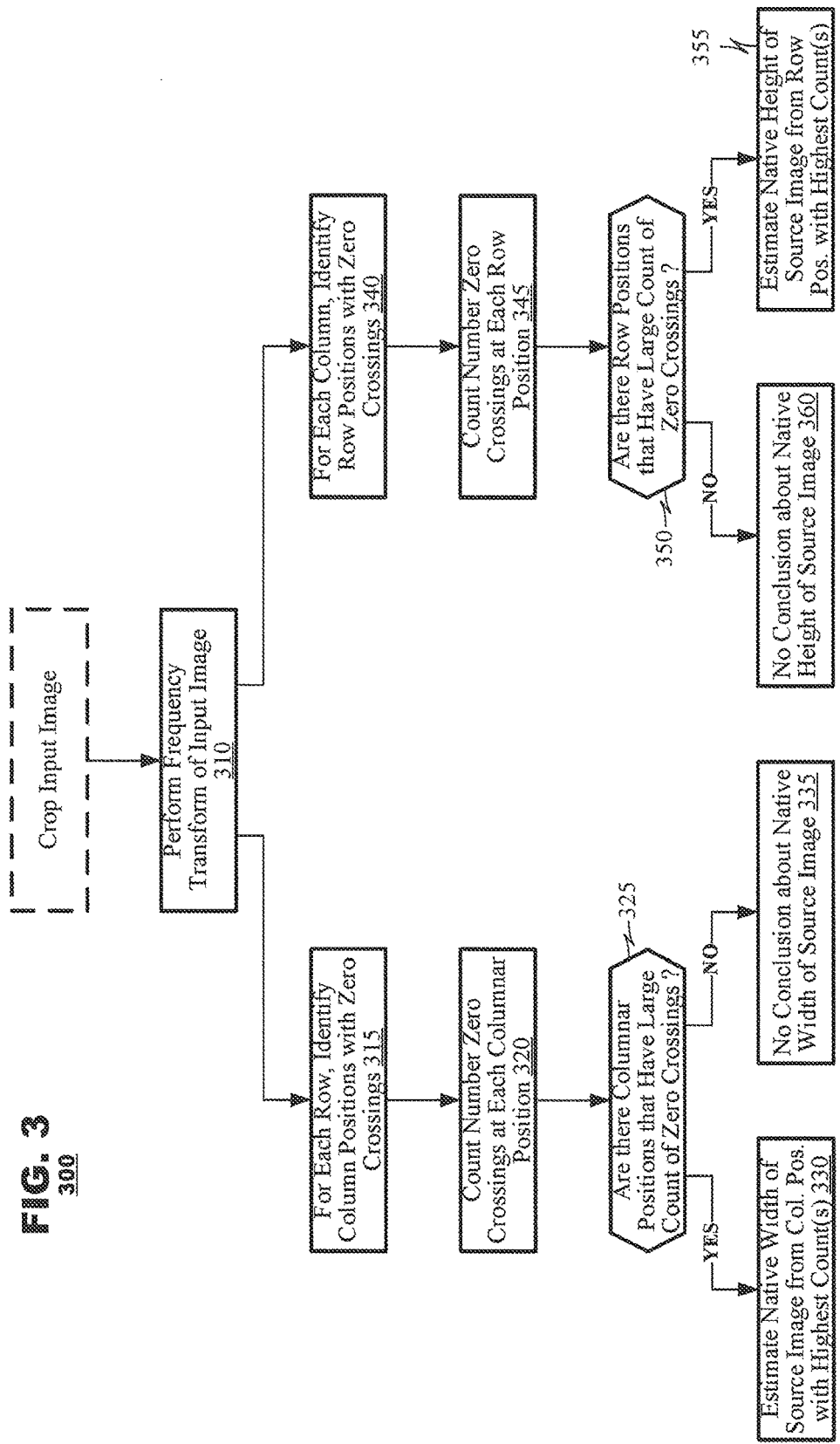

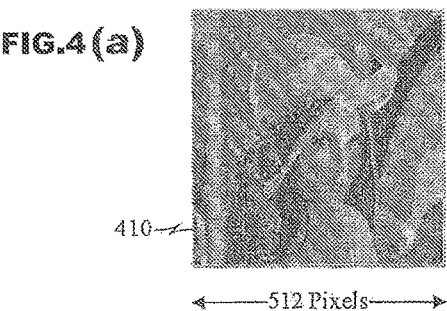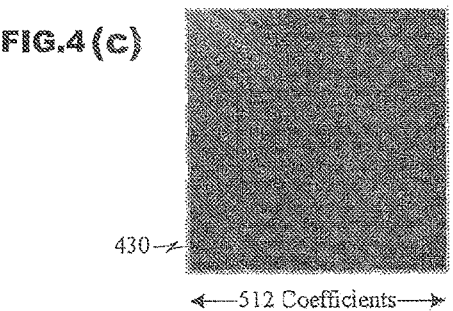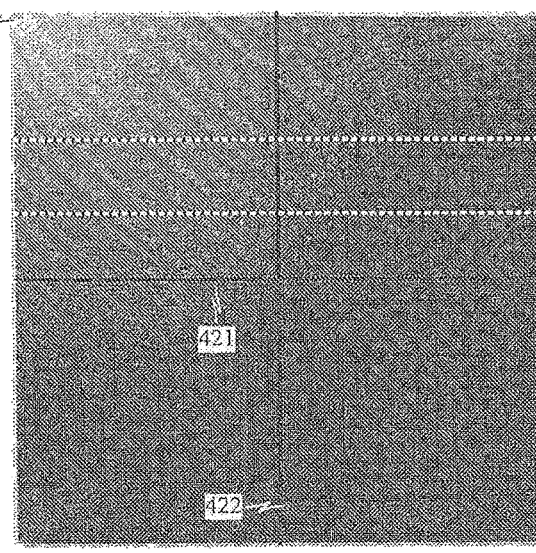

500

600

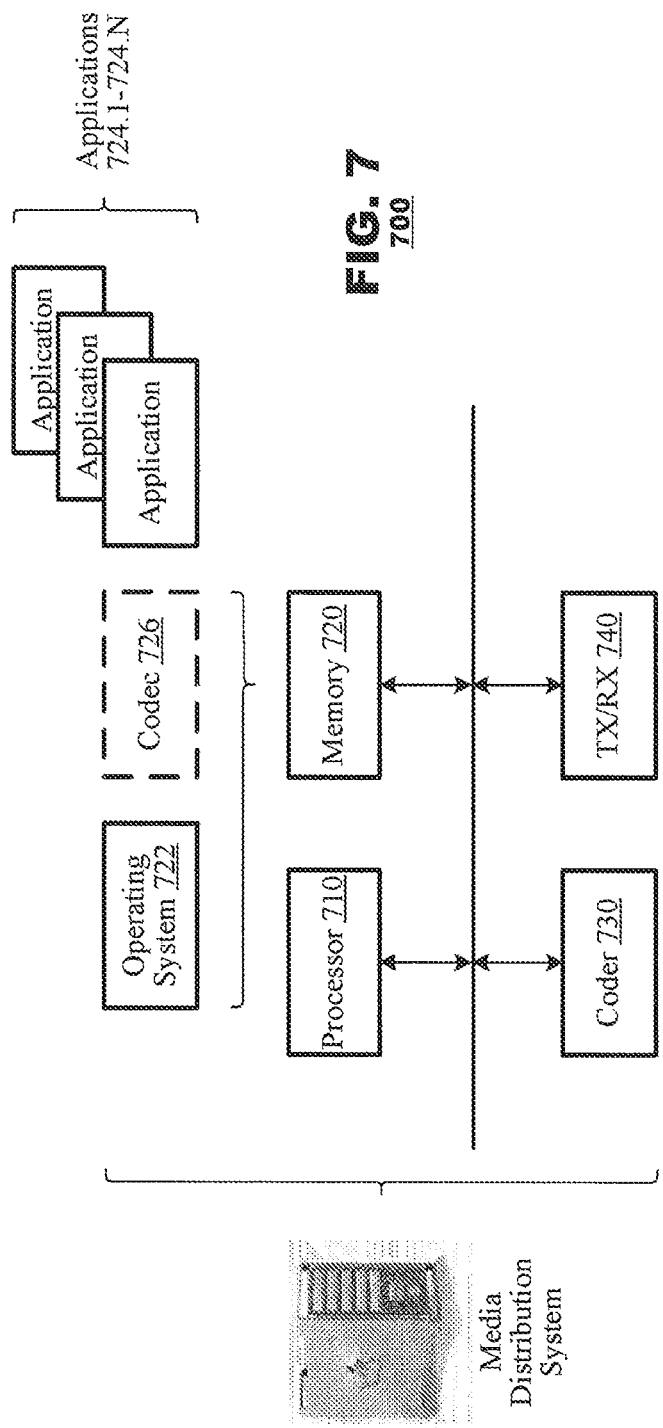

DETECTING UPSCALED SOURCE VIDEO

BACKGROUND

The present disclosure relates to media delivery systems and, in particular, to techniques for estimating source resolution of media items that are candidates for distribution.

There are many applications for media distribution in modern commerce. Although applications vary widely, media delivery systems often cause a media item having video or audio/visual content to be delivered from a first networked device (a "distribution server," for convenience) to a second networked device (a "client"), where it is rendered. Rendering may occur on personal computing devices, for example, personal computers, tablet computers, smartphones and/or personal media players, or it may occur on dedicated media players, such as televisions and/or theater systems. Moreover, the format of the media items may vary widely. The media items may be provided as 720p video, 1080p video, 4K video or any of a variety of different representations. In many cases, a distribution server may possess several copies of a single media item, each at different representations (e.g., 720p, 1080p, 4K, etc.), and it may operate according to policies that attempt to guarantee that the different representations actually meet the quality standards that are attendant to them.

A distribution server may not create the media items that it stores in all cases and, therefore, a proprietor of the distribution server cannot guarantee that a given instance of a media item meets the quality requirements of its associated representation. For example, an instance of a media item may have been uploaded to the distribution server in a first format even though it initially was created in a second, lower-resolution format. Prior to upload, the media item may have been upsampled, converted from a native, lower resolution format to a higher resolution. The upsampled image would be considered to have lower quality than an image that is natively at the higher resolution because the additional pixels in the upsampled image do not contain any detail that was not expressed at the lower resolution.

The inventors, therefore, have identified a need in the art for a tool to analyze a media item and determine whether a media item that is presented was created in at least the resolution in which it is presented.

BRIEF DESCRIPTION OF THE DRAWINGS

FIG. 1 illustrates a media delivery system according to an embodiment of the present disclosure.

FIG. 2(b) illustrates exemplary source data that may be input to an interpolation system as illustrated in FIG. 2(a). FIGS. 2(c)-(g) respectively illustrate effects of different interpolation processes.

FIG. 3 illustrates a method according to an embodiment of the present disclosure.

FIGS. 4(a)-4(c) illustrates an exemplary source image (FIG. 4(a)) that may be subject to upsampling. FIG. 4(b) illustrates an exemplary frequency transform of the source image of FIG. 4(a) after having been upsampled. FIG. 4(c) illustrates an exemplary frequency transform of the source image of FIG. 4(a) without upsampling.

FIG. 7 illustrates an exemplary computer system suitable for use with embodiments of the present disclosure.

DETAILED DESCRIPTION

Figure 2A:
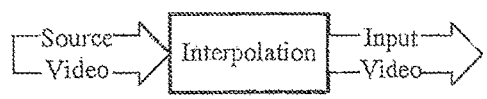
FIGS. 2(a)-2(g) illustrates exemplary interpolation processes. Specifically.
Figure 2B:
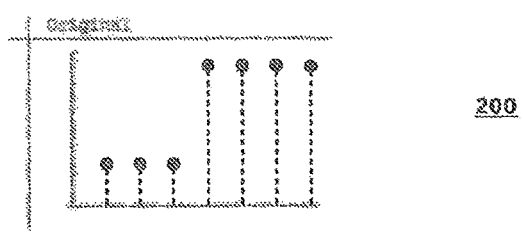
Figure 2C:
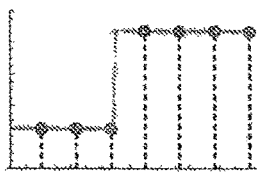
Figure 2D:
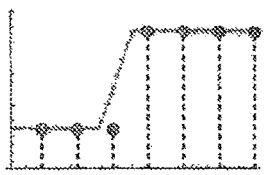
Figure 2E:
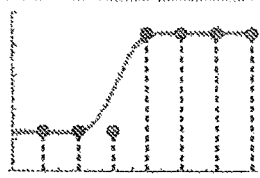
Figure 2F:
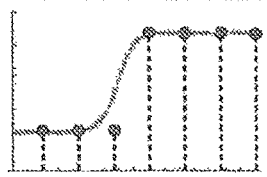
Figure 2G:
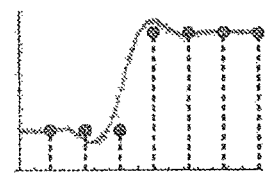

Embodiments of the invention provide techniques for estimating a source resolution of image data presented to a system. According to these techniques, input image data may be converted to a domain of frequency coefficients. Each coefficient may represent content of the input image along a respective pair of frequencies extending in two dimensions. For each set of frequency coefficients having a common frequency in one of the dimensions, zero crossings of coefficient values may be detected. The zero crossings may be counted at each frequency position in the second dimension. An estimate of the input image's source resolution may be estimated from a comparison of the zero crossings. For video, this process may be performed across images of an input video sequences.

FIG. 1 illustrates a media delivery system 100 according to an embodiment of the present disclosure. The system 100 may include one or more client terminals 110 provided in communication with a distribution server 120 via a network 130. The distribution server 120 may store various media items 140.1-140.N in local storage 125. The distribution server 120 may deliver a media item (say, item 140.1) to a client terminal 110 on request.

Media items 140.1-140.N may be provided to the distribution server 120 from a variety of sources. In one example, the distribution server 120 may be operated by a commercial enterprise that provides commercial guarantees regarding the media items 140.1-140.N that it furnishes to the client terminals 110. For example, the enterprise may indicate that the media items are provided at predetermined resolution levels, for example, at 4K resolution, 1080p resolution, 720p resolution and the like. If the enterprise furnishes a media item 140.1 that is represented to be at a first video resolution (for example, 4K resolution) but it actually possesses an inferior resolution due to upsampling, then the enterprise would violate its own policies.

The distribution server 120 may not create the media items 140.1-140.N that it stores. In some applications, media items may be furnished to the distribution sever 120 from sources 150 (called "authoring sources," for convenience) that the distribution server 120 does not control. And, while the distribution server 120 may perform operations to confirm that a given media item is provided in a format that satisfies its representations (e.g., a 4K resolution media item matches a file format that corresponds to 4K video), it is possible that a media item 140.1 will have been altered from a lower-resolution representation of video to a higher-resolution representation.

FIG. 2(a)-(g) illustrate types of interpolation that may be performed when upsampling a source image. A source image may be input to an interpolation filter that generates an image, which may be furnished to the distribution server (FIG. 1) as an input image, having higher resolution. Interpolation may occur according to any of a number of different techniques. For example, FIGS. 2(c)-(g) illustrate interpolation that may occur along a single axis (either a row or a column) of image data given a source set of pixel values, shown in FIG. 2(b). Interpolation may occur by nearest value interpolation (FIG. 2(c)), bilinear interpolation (FIG. 2(d)), bicubic interpolation (FIG. 2(e)), Gaussian interpolation (FIG. 2(f)) or Lanczos interpolation (FIG. 2(g)), among others. Each technique has its own level of complexity and generates its own set of image artifacts in the upsampled image. As described, at the end of the upsampling process, a resultant image may have a higher pixel resolution than the source image but the increased pixel resolution does not improve information content of the image.

FIG. 3 illustrates a method 300 according to an embodiment of the present disclosure. The method 300 may perform a frequency transform of an input image (box 310). Thus, where an input image constitutes a spatial array of pixel values, the frequency transform may generate a spatial array of frequency coefficients, where each coefficient represents a predetermined component of the original image at a pair of frequencies each extending in a respective direction (e.g., a first frequency in a horizontal direction in the image and a second frequency in a vertical direction). The transform coefficients may be arranged in columnar and row positions according to the frequencies they represent. Thereafter, the method 300 may process each row and each column of the transformed image.

The method 300 may traverse each row of the transformed image and identify columnar positions on each row that represent zero crossings of coefficient values (box 315). After the zero crossings on each row are identified, the method 300 may count, across all rows of the transformed image, the number of zero crossings at each columnar position (box 320). The method 300 may determine whether there are columnar positions that have a large number of zero crossings associated with them (box 325). If so, then the method 300 may estimate the native width of a source image from the columnar position(s) with the most significant number of zero crossings (box 330). If not, then no conclusions about the native width of the source image will be drawn (box 335).

The method 300 also may traverse each column of the transformed image and identify row positions on each column that represent zero crossings of coefficient values (box 340). After the zero crossings on each column are identified, the method 300 may count, across all columns of the transformed image, the number of zero crossings at each row position (box 345). The method 300 may determine whether there are row positions that have a large number of zero crossings associated with them (box 350). If so, then the method 300 may estimate the native height of a source image from the row position(s) with the most significant number of zero crossings (box 355). If not, then no conclusions about the native height of the source image will be drawn (box 360).

FIGS. 4 (a)-(c) illustrate application of the method 300 of FIG. 3 to an exemplary source image. FIG. 4(a) illustrates an exemplary source image 410 that may be upsampled prior to being submitted to a media distribution system. In its native resolution, the source image may have a first resolution, say 512×512 pixels, but it may be upsampled to a different resolution, say 1024×1024 pixels (image not shown), before being input to the media distribution system. For discussion purposes, it may be assumed that the upsampling is performed according to bilinear interpolation.

FIG. 4(b) illustrates a plot of a frequency transform of the image of FIG. 4(a) after being upsampled to a higher resolution. In the example of FIG. 4(b), the transform may create a 1024×1024 array of frequency coefficients. Typically, an origin of the array may carry a coefficient corresponding to the lowest frequency in the array (a DC coefficient). At different positions along a given row of the array, the coefficients represent increasing frequency component in the columnar direction. At different positions along a given column of the array, the coefficients represent increasing frequency component in the row direction. In the grayscale illustration of FIGS. 4(a)-4(c), white content represents coefficients having relatively large magnitudes and darker content represents coefficient values having relatively small magnitudes. The coefficients also may have a sign component (e.g., they are either positive or negative) but these components are not illustrated in FIG. 4(b).

When an input image has been generated from upsampling of a source image at a lower resolution, the frequency transform of the input image tends to exhibit zero valued coefficients at frequencies that correspond to the degree of upsampling. For example, as illustrated in FIG. 4(b), the input image exhibits a row 421 and a column 422 whose frequency coefficients are essentially zero-valued. The method 300 essentially searches for these small coefficient values in its row-by-row and column-by-column searches.

FIG. 4(c) illustrates a frequency transform of the source image 410 at its native resolution. In this example, a 512×512 pixel image is transformed to a 512×512 array of transform coefficients. The frequency transform 430 of FIG. 4(c) does not exhibit the zero-valued coefficients that are found in the frequency transform 420 of the upsampled version of the source image 410.

FIG. 5(a)-5(d) illustrates exemplary graphs of coefficient values for three rows of a transformed image. In this example, a first row (Row 1) is shown as having three zero crossings 502-506 at various columnar positions along the row, a second row (Row 2) is shown having five zero crossings 508-516 at various columnar positions along the second row, and a third row (Row 3) is also shown having five zero crossings 518-526 at various positions along that row.

Figure 5A:
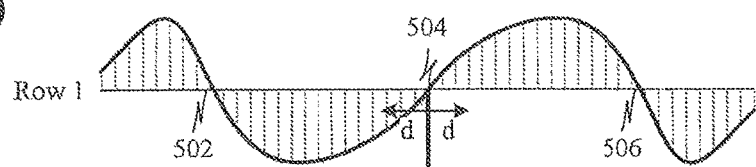
FIGS. 5(a)-5(d) illustrates exemplary graphs of coefficient values for three row of a transformed image, shown in FIGS. 5(a)-(c), and an exemplary summation of zero crossings, shown in FIG. 5(d).
Figure 5B:
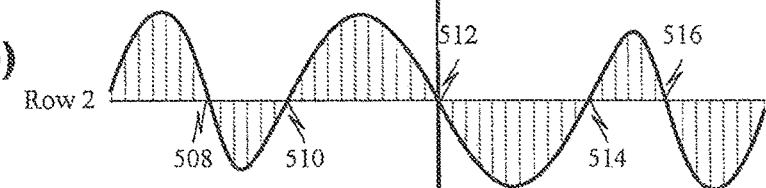
Figure 5C:
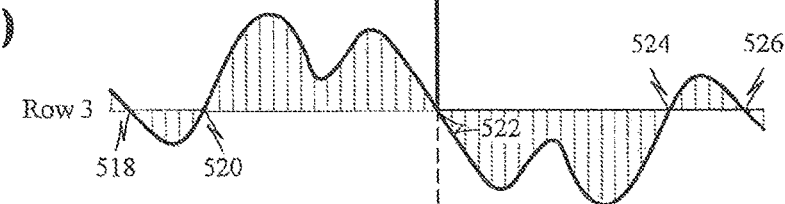
Figure 5D:
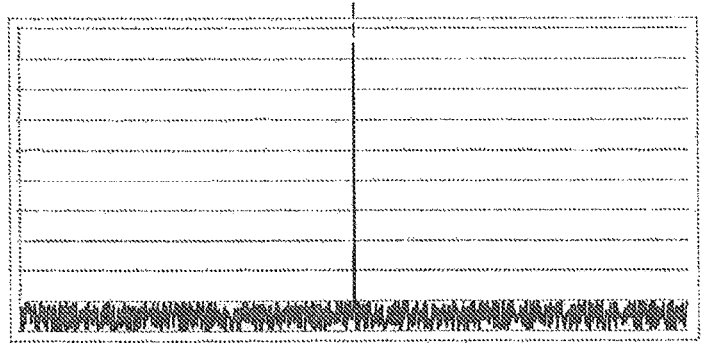

In this example, the zero crossings 504, 512 and 522 of the three rows coincide at a common columnar position. The other zero crossings 502, 506-510, 514-520 and 524-526 do not coincide with each other. Thus, in this example, when the method 300 calculates the number of zero crossings at each columnar position, the position correspond to the zero crossings 506, 516 and 528 have a higher zero crossing count value than the positions of the other zero crossings 502, 506-510, 514-520 and 524-526. And, when the count values are summed across all 1,024 rows of the transform array of FIG. 4(b), count values might occur as shown in FIG. 5(d). In this example, a large count value is observed at a columnar position mid-way across the rows (position 512 in a row having 1,024 coefficients), which indicates that the source image's native width was 512 pixels.

A similar phenomenon may be observed with zero crossings that occur in columns of the transform array. It is expected that, when zero crossing count values are summed across all columns of a transform array and a large count value is observed at row position(s) along the columns, it indicates the source image's native height.

As shown above, the method 300 of FIG. 3 may estimate the source resolution of an input image.

In many applications, images that have been upsampled exhibit certain patterns when converted in the frequency domain. For example, as illustrated in FIGS. 5(a)-5(d), upsampled images often exhibit patterns in frequency distribution that, absent noise or some other distortion, cause frequency coefficients on one side of a zero crossing to be mirrored on an opposite side of the zero crossing. Consider the coefficients illustrated in FIGS. 5(a)-(c). Frequency coefficients are mirrored on opposite sides of the zero crossings 504, 512 and 522, respectively, whereas frequencies coefficients are not mirrored in the cases of zero crossings 502, 506-510, 514-520 and 524-526. In an embodiment, the method 300 may analyze the frequency coefficients at a plurality of distances on one side of a zero crossing and compare them to counterpart frequency coefficients at the same distance on the other side of the zero crossing. If the magnitudes of the frequency coefficients match those of their counterparts, the candidate zero crossing may be given a higher weight in summation than another zero crossing where frequency coefficients on one side of the other zero crossing do not match those of their counterparts on the other side of the other zero crossing.

In another application, upsampling may cause frequency coefficients to change sign at a zero crossing. In such an embodiment, the method 300 may analyze the frequency coefficients at a plurality of distances on one side of a zero crossing and compare them to counterpart frequency coefficients at the same distance on the other side of the zero crossing. If the signs of the frequency coefficients differ from those of their counterparts, the candidate zero crossing may be given a higher weight in summation than another zero crossing where frequency coefficients on one side of the other zero crossing do not match those of their counterparts on the other side of the other zero crossing. In a further embodiment, if the signs of the coefficients on either side of a zero crossing match each other, the method 300 may sum up the magnitudes of the coefficients on either side of the zero crossing. If the summed magnitudes match each other, the increased weight may be given to the candidate zero crossing.

In a further embodiment, candidate zero crossings may be removed from consideration (or given relatively small weights) when they are surrounded by frequency coefficients below a given magnitude.

As indicated, the count of zero crossings contemplated by boxes 320 and 345 (FIG. 3) may be performed using weightings that are applied based on analysis of the candidate zero crossings and the frequency coefficients that neighbor them. Thus, the counting may be performed as weighted summations where individual candidate zero crossings are given relatively high or relatively low weights based on the outcome of these additional analyses.

Figure 6:
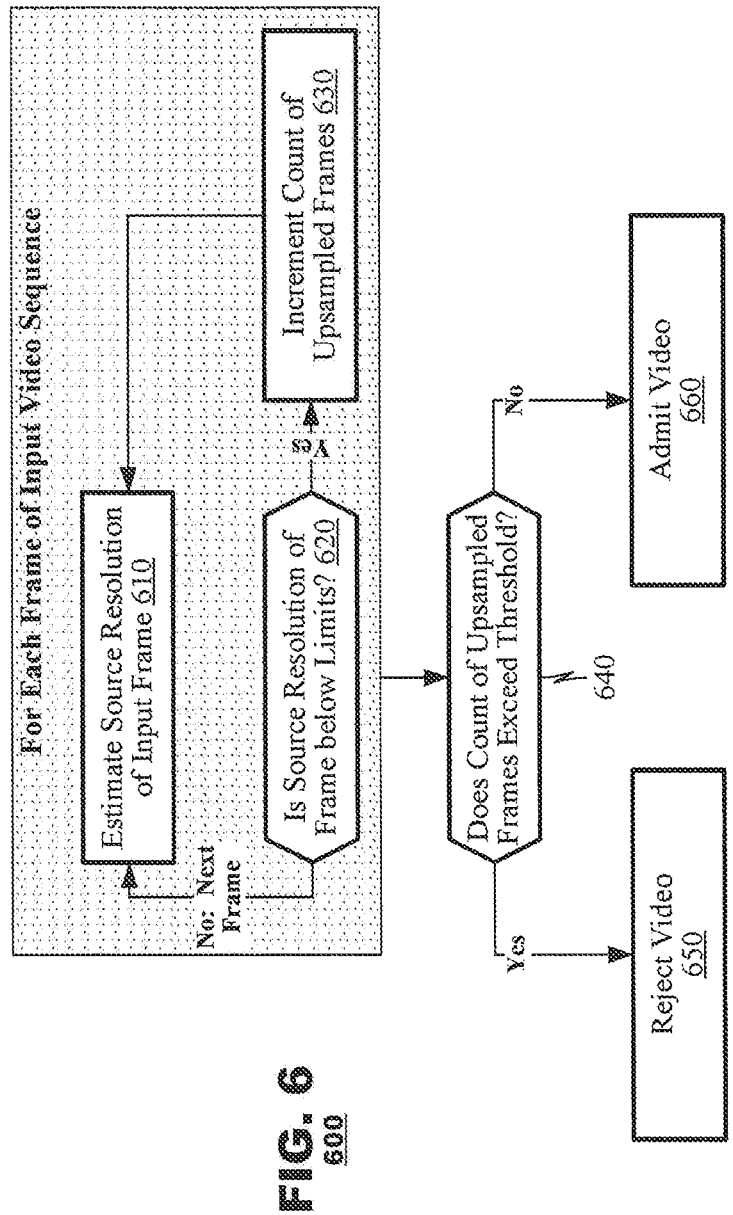
FIG. 6 illustrates a method of estimating source resolution of a video sequence according to an embodiment of the present disclosure.

FIG. 6 illustrates a method 600 of estimating source resolution of a video sequence according to an embodiment of the present disclosure. The method 600 may estimate a source resolution of each frame of the video sequence (box 610) and determine whether a source resolution of the frame is below a predetermined limit (box 620). Estimation of the source resolution may occur as discussed in FIG. 3. If the estimated source resolution is lower than the predetermined limit, the method 600 may increment a count of upsampled frames detected for the video sequence (box 630). The operations of boxes 610-630 may be repeated for each frame of the input video sequence.

Once all frames of the video sequence have been processed, the method 600 may determine whether the count of upsampled frames exceeds a threshold (box 640). If so, the method 600 may cause the input video sequence to be rejected (box 650). If not, then the method 600 may cause the input video sequence to be admitted (box 660).

The method 600 finds application in a distribution server 120 (FIG. 1) to determine whether input videos should be admitted to the distribution system or rejected. Thus, when a distribution server 120 receives an input video from an authoring source, it may perform the methods of FIG. 3 and/or FIG. 6 to estimate whether the input video has a native source size that is different than the size of the input video as it is presented to the distribution server 120. If the distribution server 120 estimates that the native source size of the input video is smaller than a required size, the distribution server 120 may reject the input video from being admitted to the media delivery system 100.

In an embodiment, rather than performing the method on every frame from a video sequence, the resolution estimation performed in box 610 may be performed on a sub-set of frames from the video sequence. For example, the resolution estimation may be performed at a lower frame rate than the sequence's native frame rate, for example, on every fourth or fifth frame from the video sequence.

In a further embodiment, the number of frames on which the resolution estimation is performed may vary dynamically based on frame content. For example, frames may be selected (or de-selected) from resolution estimation based on variation in frame content as compared to neighboring frames. Thus, when processing a frame Fn, the method 600 may compare content of frame Fn to content of a previous frame Fn−1 on a pixel-by-pixel basis and generate an overall frame difference value ΔFn from an aggregation of the pixel differences. The method 600 may compare the frame difference value ΔFn to a threshold TH to determine whether resolution estimation should be performed. If the frame difference value is lower than the threshold, then resolution estimation may be skipped but, if the frame difference value is higher than the threshold, then the resolution estimation may be performed. In an embodiment, the threshold may be content-adaptive. For example, the threshold may be developed from statistics of the video sequence such as the mean and variance of frame differences across a one-second window of video in which frames Fn and Fn−1 appear.

In some applications, the media delivery system 100 may operate as a distributor of produced audio-visual content including movies, television programming, and other production content. The media delivery system 100 may perform its analyses in conjunction with other processes of the distribution server 120 that parse input video into constituent parts. For example, a distribution server 120 may perform processes to recognize a portion of a movie representing production credits and distinguish them from other parts representing narrative content. In another embodiment, the distribution server 120 may perform processes to distinguish scenes within the narrative content from each other. In such embodiments, the distribution server 120 may perform the operations of FIGS. 3 and/or 6 on each partition of the input video that the distribution server 120 recognizes. It may apply different thresholds (box 640) to the different partitions. For example, the threshold may be unlimited for a partition representing movie credits but be set to 10% of the narrative portion of the movie. Similarly, the threshold may be set so that a violation of a given scene occurs if 10% of the scene contains upsampled content and the video is rejected in its entirety if 10% of the number of scenes is in violation. In practice, threshold(s) may be defined in whatever way may be convenient for operators of the media delivery system 100.

The foregoing discussion has described operation of the embodiments of the present disclosure in the context of a media delivery system. Commonly, these components are provided as electronic devices, such as a network of coordinated servers. Media delivery systems can be embodied in integrated circuits, such as application specific integrated circuits, field programmable gate arrays and/or digital signal processors. Alternatively, they can be embodied in computer programs that execute on personal computers, notebook computers, tablet computers, smartphones. Such computer programs typically are stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

For example, the techniques described herein may be performed by a central processor of a computer system that serves as the media distribution system. FIG. 7 illustrates an exemplary computer system 700 that may perform such techniques. The computer system 700 may include a central processor 710, a memory 720, a coder 730, and a transceiver 740 provided in communication with one another.

The central processor 710 may read and execute various program instructions stored in the memory 720 that define an operating system 722 of the system 700 and various applications 724.1-724.N. As it executes those program instructions, the central processor 710 may read, from the memory 720, which may be coded for transmission. In an embodiment, rather than provide a hardware-based coder 740, the central processor 710 may execute a program 726 that operates as a coder.

As indicated, the memory 720 may store program instructions that, when executed, cause the processor to perform the techniques described hereinabove, such as the operations described in FIGS. 3 and 6. The memory 720 may store the program instructions on electrical-, magnetic- and/or optically-based storage media.

The coder, whether provided as a hardware-based coder 730 or a software-based coder 726, may perform operations to compress or transcode input videos for delivery to client devices 110 (FIG. 1). As part of its operation, the coder 730/726 may code input video data according to a governing coding protocol such as ITU-T H.265, H.264 or a predecessor standard.

The transceiver 740 may represent a communication system to transmit videos to client devices.

The foregoing description has been presented for purposes of illustration and description. It is not exhaustive and does not limit embodiments of the disclosure to the precise forms disclosed. Modifications and variations are possible in light of the above teachings or may be acquired from the practicing embodiments consistent with the disclosure. Unless described otherwise herein, any of the methods may be practiced in any combination.

We claim:

1. A method comprising:
converting an input image to a domain of frequency coefficients, each coefficient representing content of the input image as a respective pair of frequencies each extending in one of two dimensions,
for each set of frequency coefficients having a common frequency in a first dimension considered in order by frequency in a second dimension, identifying zero crossings among the set of frequency coefficients,
counting the zero crossings from among the sets at each frequency in the second dimension, and
estimating whether the input image was upsampled from the count of zero crossings.

2. The method of claim 1, wherein
the frequency coefficients are organized as an array of the coefficients having columns and rows, wherein the coefficients in a common row have the common frequency in the first dimension and the coefficients along each common row represent increasing frequencies in the second dimension, and
the identifying zero crossing occurs along each row, and
the counting of zero crossings occurs at columnar positions among the array.

3. The method of claim 1, wherein
the frequency coefficients are organized as an array of the coefficients having columns and rows, wherein the coefficients in a common column have the common frequency in the first dimension and the coefficients along each common column represent increasing frequencies in the second dimension, and
the identifying zero crossing occurs along each column, and
the counting of zero crossings occurs at row positions among the array.

4. The method of claim 1, wherein the zero crossings are identified from frequency coefficients having a zero value.

5. The method of claim 1, wherein the zero crossings are identified from a determination that magnitudes of a predetermined number of frequency coefficients on one side of a candidate zero crossing match magnitudes of another predetermined number of frequency coefficients at counterpart locations on another side of the candidate zero crossing.

6. The method of claim 1, wherein the zero crossings are identified from a determination that signs of a predetermined number of frequency coefficients on one side of a candidate zero crossing are opposed to signs of another predetermined number of frequency coefficients at counterpart locations on another side of the candidate zero crossing.

7. A method comprising:
estimating a native size of frames from a video sequence by, for each of a plurality of frames from the video sequence:
converting the respective frame to a domain of frequency coefficients, each coefficient representing content of the input frame as a respective pair of frequencies each extending in one of two dimensions;
for each converted frame:
for each set of frequency coefficients having a common frequency in a first dimension considered in order by frequency in a second dimension, identifying zero crossings among the set of frequency coefficients,
counting the zero crossings from among the sets at each frequency in the second dimension, and
estimating whether the input frame was upsampled from the count of zero crossings; and
when the number of input frames that are estimated as being upsampled exceed a predetermined value, rejecting the video sequence.

8. The method of claim 7, wherein the video sequence is a partition of a media item.

9. The method of claim 7, further comprising, prior to the estimating the native size, detecting scene changes from a media item, wherein the video sequence is a scene of the media item.

10. The method of claim 7, further comprising,
prior to the estimating the native size, partitioning a media item into partitions, and
performing the estimating the native size for each partition of the media item,
wherein the predetermined value varies for different partitions.

11. The method of claim 7, wherein:
the frequency coefficients are organized as an array of the coefficients having columns and rows, wherein the coefficients in a common row have the common frequency in the first dimension and the coefficients along each common row represent increasing frequencies in the second dimension, and the identifying zero crossing occurs along each row, and the counting of zero crossings occurs at columnar positions among the array.

12. The method of claim 7, wherein
the frequency coefficients are organized as an array of the coefficients having columns and rows, wherein the coefficients in a common column have the common frequency in the first dimension and the coefficients along each common column represent increasing frequencies in the second dimension, and the identifying zero crossing occurs along each column, and the counting of zero crossings occurs at row positions among the array.

13. The method of claim 7, wherein the zero crossings are identified from frequency coefficients having a zero value.

14. The method of claim 7, wherein the plurality of frames are selected from the video sequence at a rate lower than a native frame rate of the video sequence.

15. The method of claim 7, wherein the plurality of frames are selected from the video sequence based on a comparison of each frame's content with their neighbor frames.

16. The method of claim 7, wherein the zero crossings are identified from a determination that magnitudes of a predetermined number of frequency coefficients on one side of a candidate zero crossing match magnitudes of another predetermined number of frequency coefficients at counterpart locations on another side of the candidate zero crossing.

17. The method of claim 7, wherein the zero crossings are identified from a determination that signs of a predetermined number of frequency coefficients on one side of a candidate zero crossing are opposed to signs of another predetermined number of frequency coefficients at counterpart locations on another side of the candidate zero crossing.

18. A media distribution system, comprising:
a server, having a processor, to selectively admit and reject input videos based on an estimation of native sizes of the input videos performed, respectively, on analysis of frequency domain representations of image information of the input video, wherein for each set of frequency coefficients having a common frequency in a first dimension, the analysis includes:
identifying zero crossings among the set of frequency coefficients, counting the zero crossings from among the sets at each frequency in the second dimension, and
a storage device to store admitted input videos.

19. The media distribution system of claim 18, wherein for one of the input videos, the server:
prior to the estimating the native size detects scene change (s) from the one input video, detects scene changes in the one input video,
estimates the native size of the input video on a scene-by-scene basis, and
rejects the one input video when the number of scenes that are estimated as having upsampled content exceeds a predetermined value.

20. The media distribution system of claim 18, wherein for one of the input videos, the server:
partitions the one input video into partitions, and
estimates the native size of the input video on a partition-by-partition basis, and rejects the one input video when the number frames in each partition that are estimated as having upsampled content exceeds respective predetermined values, wherein the predetermined value varies for different partitions.

21. A non-transitory computer readable medium storing program instructions that, when executed by a processing device, causes the device to:
estimate a native size of frames from a video sequence by, for each of a plurality of frames from the video sequence:
converting each frame to a domain of frequency coefficients, each coefficient representing content of the respective frame as a respective pair of frequencies each extending in one of two dimensions, for each converted frame:
for each set of frequency coefficients having a common frequency in a first dimension considered in order by frequency in a second dimension, identifying zero crossings among the set of frequency coefficients, counting the zero crossings from among the sets at each frequency in the second dimension, and
estimating whether the input frame was upsampled from the count of zero crossings;
and when the number of selected frames that are estimated as being upsampled exceeds a predetermined value, reject the video sequence.

22. The medium of claim 21, wherein:
the frequency coefficients are organized as an array of the coefficients having columns and rows, wherein the coefficients in a common row have the common frequency in the first dimension and the coefficients along each common row represent increasing frequencies in the second dimension, and
the identifying zero crossing occurs along each row, and
the counting of zero crossings occurs at columnar positions among the array.

23. The medium of claim 21, wherein:
the frequency coefficients are organized as an array of the coefficients having columns and rows, wherein the coefficients in a common column have the common frequency in the first dimension and the coefficients along each common column represent increasing frequencies in the second dimension, and
the identifying zero crossing occurs along each column, and
the counting of zero crossings occurs at row positions among the array.

24. The medium of claim 21, wherein the zero crossings are identified from frequency coefficients having a zero value.

25. The medium of claim 21, wherein the zero crossings are identified from a determination that magnitudes of a predetermined number of frequency coefficients on one side of a candidate zero crossing match magnitudes of another predetermined number of frequency coefficients at counterpart locations on another side of the candidate zero crossing.

26. The medium of claim 21, wherein the zero crossings are identified from a determination that signs of a predetermined number of frequency coefficients on one side of a candidate zero crossing are opposed to signs of another predetermined number of frequency coefficients at counterpart locations on another side of the candidate zero crossing.

* * * * *